United States Patent [19]

Matsuura

[11] Patent Number: 5,203,532
[45] Date of Patent: Apr. 20, 1993

[54] SEAT ADJUSTER

[75] Inventor: Hiroshi Matsuura, Shizuoka, Japan

[73] Assignee: Fuji Kiko Co., Ltd., Japan

[21] Appl. No.: 760,971

[22] Filed: Sep. 17, 1991

[30] Foreign Application Priority Data

| Sep. 18, 1990 | [JP] | Japan | 2-97691[U] |
| Sep. 18, 1990 | [JP] | Japan | 2-97692[U] |
| Sep. 18, 1990 | [JP] | Japan | 2-248202 |

[51] Int. Cl.$^5$ ............................................. A45D 19/04
[52] U.S. Cl. ........................................ 248/394; 248/421; 297/313; 297/338
[58] Field of Search .............. 248/371, 394, 395, 396, 248/397, 398, 421, 429, 430; 297/313, 325, 330, 338

[56] References Cited

U.S. PATENT DOCUMENTS

| 4,529,159 | 7/1985 | Terada | 297/313 X |
| 4,765,582 | 8/1988 | Babbs | 248/396 X |
| 4,767,156 | 8/1988 | Yamada | 248/394 X |
| 4,775,186 | 10/1988 | Nishino | 248/429 X |
| 4,787,594 | 11/1988 | Ikegaya | 248/421 |
| 4,834,333 | 5/1989 | Saito | 297/338 X |
| 4,871,137 | 10/1989 | Ikegaya | 248/396 |
| 4,948,081 | 8/1990 | Hatta | 248/396 |

Primary Examiner—J. Franklin Foss
Attorney, Agent, or Firm—Ronald P. Kananen

[57] ABSTRACT

A seat adjuster is disclosed, which comprises a seat pan; parallel first and second base members; spaced first and second rod members, each being rotatably supported by the base members; first and second link mechanisms respecitvely connected to the first rod member and mounting thereon a front part of the seat pan, the first and second link mechanisms raising the front part of the seat pan when the first rod member is rotated about its axis in a given direction; third and fourth link mechanism respectively connected to the second rod member and mounting thereon a rear part of the seat pan, the third and fourth link mechanism raising the rear part of the seat pan when the second rod member is rotated about its axis in a given direction; and first and second drive mechanisms mounted to the first base plate for turning the first and second rod members respectively. Each drive mechanism has a one-way clutch function which locks parts of the drive mechanism when a torque is applied thereto from the associated rod member. The first rod member has a sector gear connected thereto and operatively engaged with the first drive mechanism. The sector gear is positioned at an opposite side of the second drive mechanism with respect to the first drive mechanism.

15 Claims, 8 Drawing Sheets

SEAT ADJUSTER

BACKGROUND OF THE INVENTION

1. Field of the Invention

The present invention relates to manual seat adjusters for use in a motor vehicle or the like, and more particularly to manual seat adjusters of a type which is equipped with seat sliding, lifting and reclining mechanisms.

2. Description of the Prior Art

Hitherto, various types of manual seat adjusters have been proposed and put into practical use particularly in the field of wheeled motor vehicles. Some of them are of a type which is equipped with seat sliding, lifting and reclining mechanisms. The seat sliding mechanism is for adjusting a fore-and-aft position of the seat, the seat lifting mechanism is for adjusting the height of the seat, and the seat reclining mechansim is for adjusting the inclination angle of a seatback of the seat. However, due to their inherent constructions, some of the seat adjusters of such type fail to exhibit satisfactory performance. In fact, some of them suffer from the drawback that a very large driving force is needed to operate the seat lifting mechanism. Others suffer from the drawback that a considerable amount of play between parts tends to occur during operation of the seat reclining mechanism.

SUMMARY OF THE INVENTION

It is therefore an object of the present invention to provide a seat adjuster of a type having seat sliding, lifting and reclining mechanisms, which obviates the above-mentioned drawbacks.

According to the present invention, there is provided a seat adjuster for adjusting the position of a seat, which comprises a seat pan on which the seat is to be mounted; parallel first and second base members; spaced first and second rod members, each being rotatably supported by the base members; first and second link mechanisms respectively connected to spaced portions of the first rod member and mounting thereon a first part of the seat pan, the first and second link mechanisms raising the first part of the seat pan when the first rod member is rotated about its axis in a given direction; third and fourth link mechanisms respectively connected to spaced portions of the second rod member and mounting thereon a second part of the seat pan, the third and fourth link mechanisms raising the second part of the seat pan when the second rod member is rotated about its axis in a given direction; and first and second drive mechanisms mounted to spaced portions of the first base plate for turning the first and second rod members respectively, each drive mechanism having a one-way clutch function which locks parts of the drive mechanism when a torque is applied thereto from the associated rod member, wherein the first rod member has a sector gear connected thereto and operatively engaged with the first drive mechanism, the sector gear being positioned at an opposite side of the second drive mechanism with respect to the first drive mechanism.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the terms "front", "rear", "right", "left", "upward", "downward" and the like are to be understood with respect to a seat to which a seat adjuster of the invention is applied.

Referring to the drawings, there is shown the seat adjuster according to the present invention. This arrangement has seat sliding, lifting and reclining mechanisms as will become apparent as the description proceeds.

In FIGS. 1 to 4, denoted by numerals 1 and 1a are left and right upper rails. These rails are slidably disposed on lower rails 1b securedly mounted on a vehicle floor (not shown). Although not specifically shown in the drawings, a known position lock mechanism is associated with the right upper and lower rails to lock the right upper rail 1a in a desired fore-and-aft position relative to the fixed right lower rail.

Figure 3:
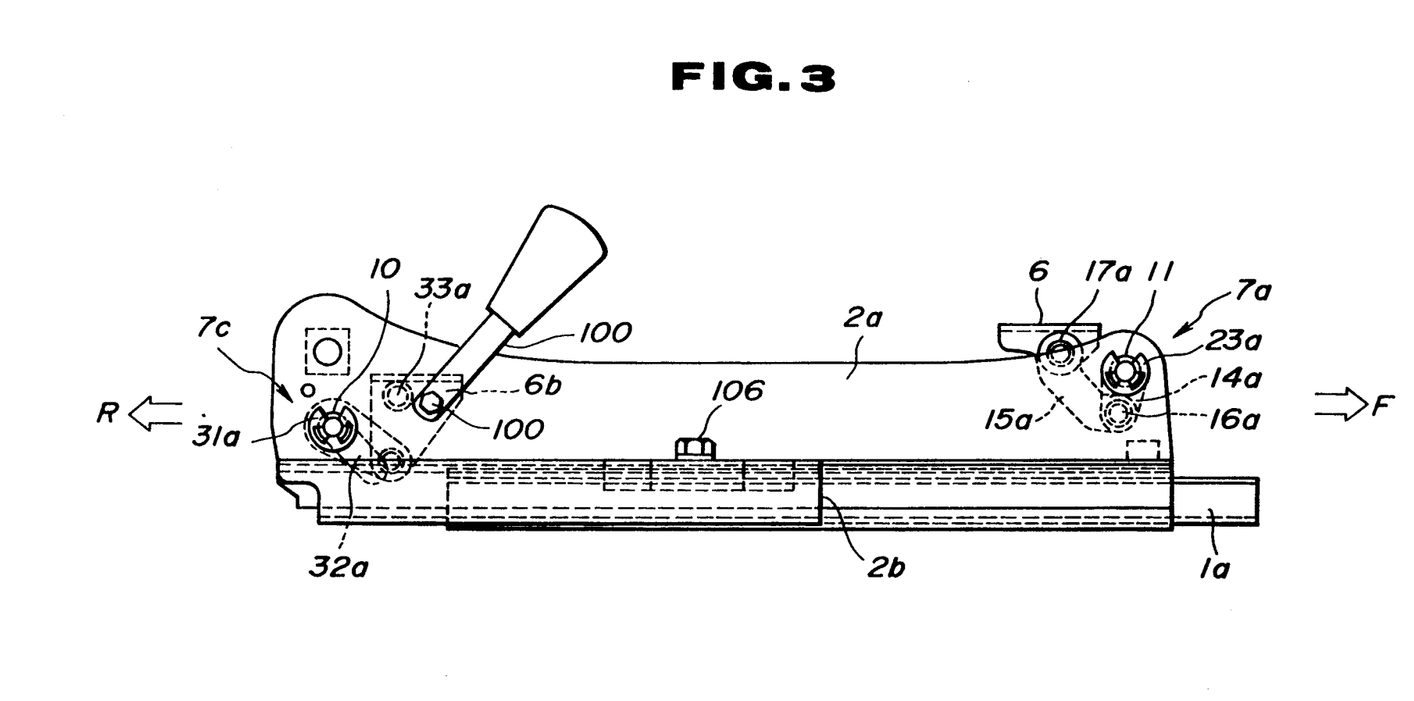
FIG. 3 is a side view of the seat adjuster, as taken from the other side of the adjuster.

The upper and lower rails and the lock mechanism thus constitute a seat sliding mechanism of the seat adjuster of the invention. In FIG. 3, a locking lever 13 carried by the right upper rail 1a is shown, which is a part of the lock mechanism.

Figure 1:
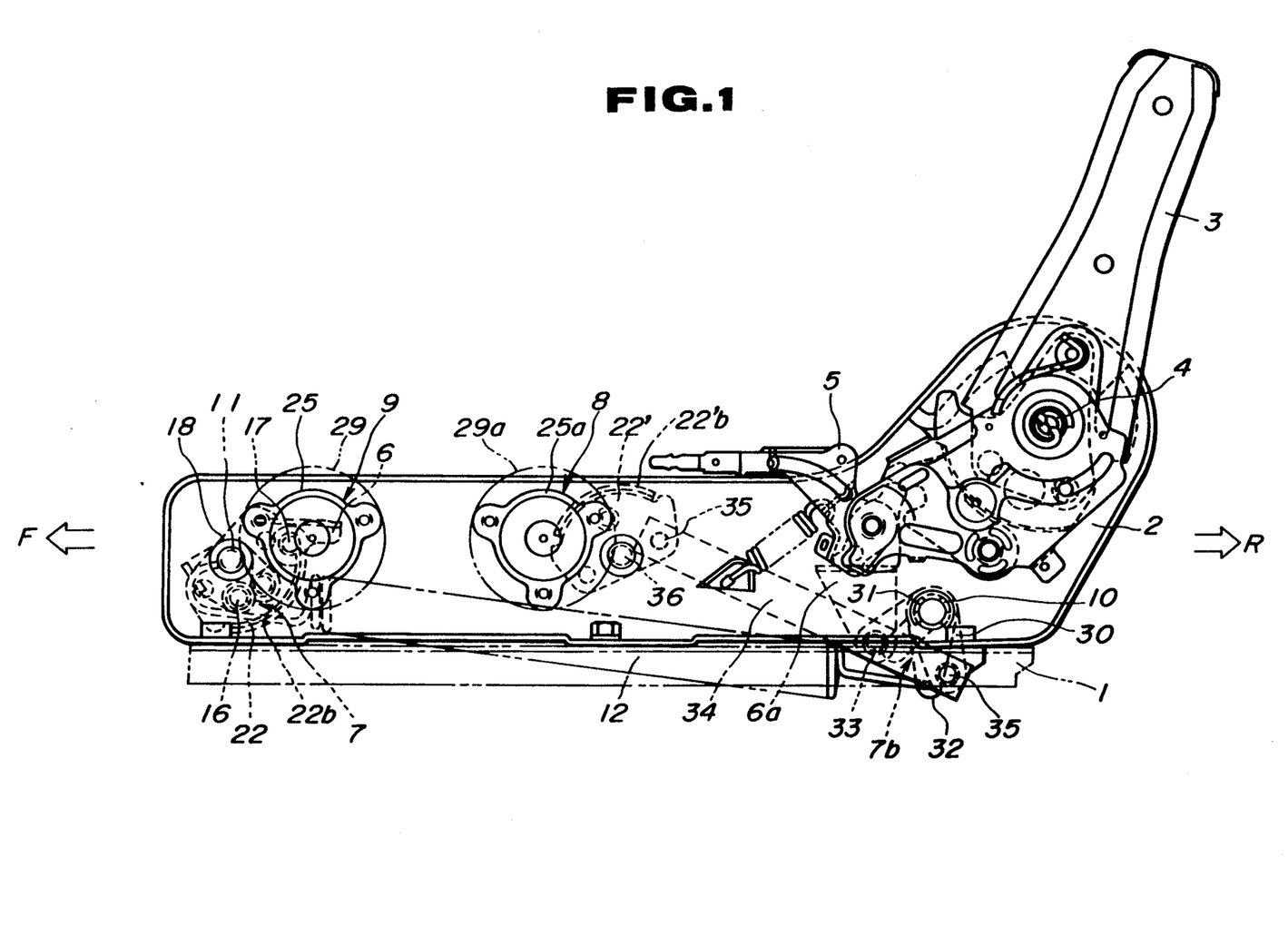
FIG. 1 is a side view according to a seal adjuster of the present invention, as viewed from one side of the adjuster and wherein some parts are removed for clarity.
Figure 4:
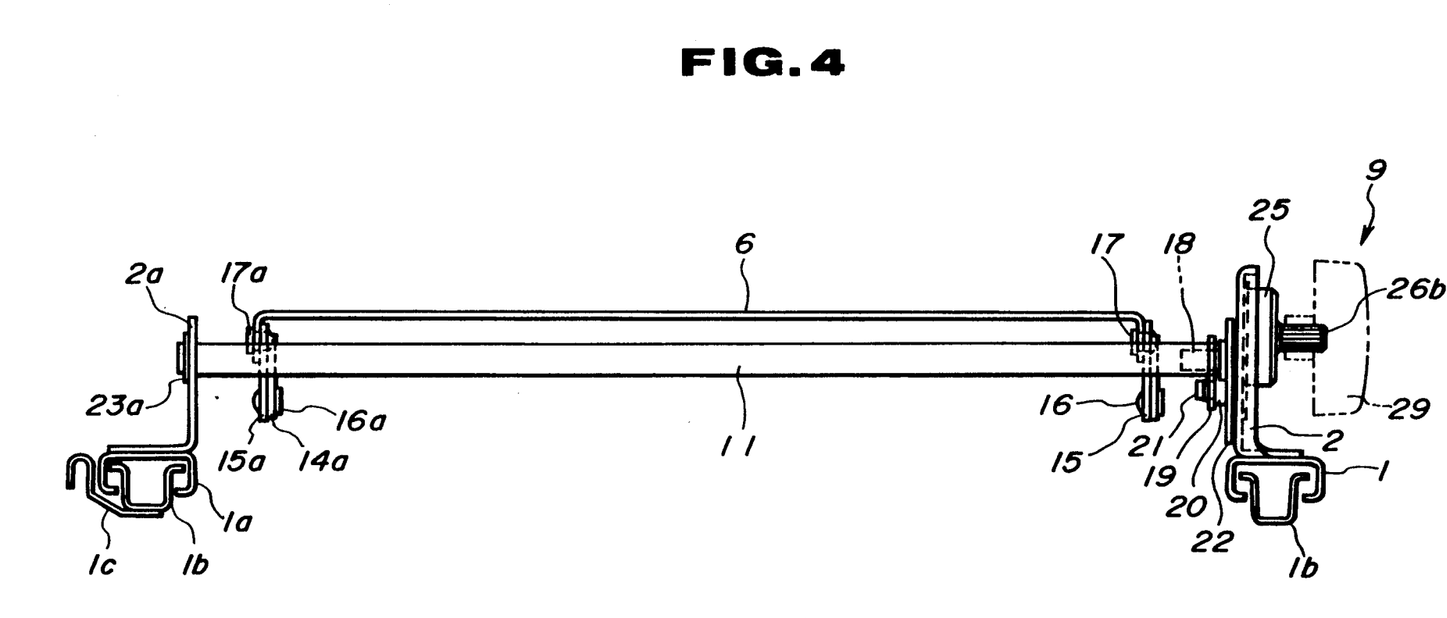
FIG. 4 is a front view of the seat adjuster, as taken from the front of the adjuster.

As is seen from FIGS. 1, 3 and 4, extend respective base plates 2 and 2a extended upwardly from the left and right upper rails 1 and 1a.

Figure 2:
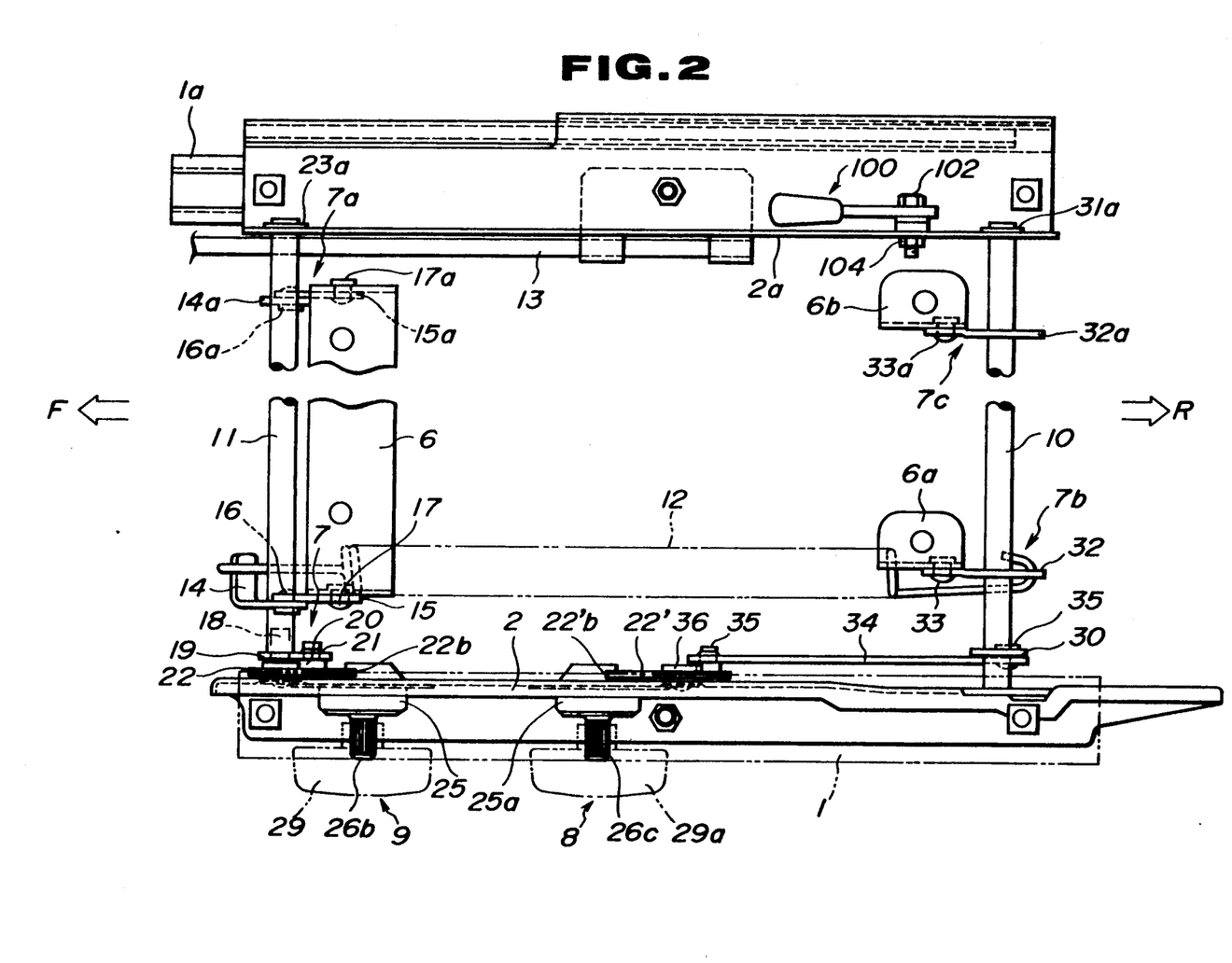
FIG. 2 is a plan view of the seat adjuster of the invention.
Figure 5:
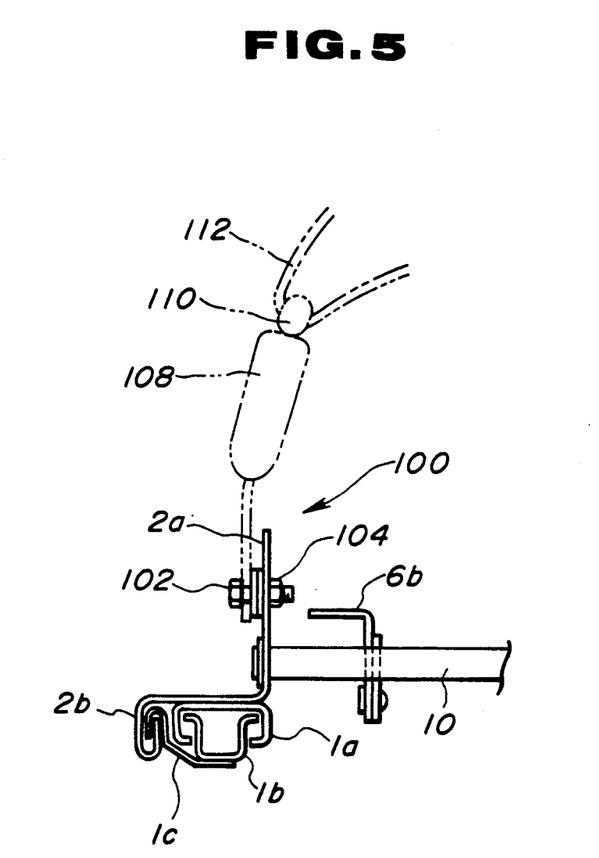
FIG. 5 is a rear view of the seat adjuster showing the position where a seat belt anchor is installed.

As is seen from FIGS. 2, 3 and 5, a seat belt anchor 100 is connected to a rear portion of the right base plate 2a by means of a bolt 102 and a nut 104. Suitable washers are used for the connection of the belt anchor 100 and the right base plate 2a. As is seen from FIG. 5, the base plate 2a has a generally L-shaped cross section and is secured to the upper rail 1a. The base plate 2a has a downward extending middle portion 2b which is curled inward. As shown in FIG. 3, a bolt is used to assure the connection of the middle portion 2b of the base plate 2a to the upper rail 1a. An elongate reinforcing plate 1c is secured to the right lower rail 1b and extends therealong. The reinforcing plate 1c has a curled upper portion which is slidably interlocked with the curled portion of the base plate 2a. The slidable interlocking between these two members 2b and 1c does not interfere the slidable movement of the upper rail 1a relative to the lower rail 1b. As shown in FIG. 5, the seat belt anchor 100 has a buckle 108 for detachably catching a tongue member 110 held by a seat belt 112 on its top portion. Due to the interlocked engagement between the base plate 2a and the fixed reinforcing plate 1c, the seat belt anchor 100 can be held in position even when an abnormally large force is applied thereto by a belt wearer such as occurs during a vehicle collision or the like.

As is seen from FIG. 1, the left base plate 2 has a raised rear portion to which a pivotal arm 3 is connected by way of a hinge shaft 4. Denoted by numeral 5 is a release lever which is pivotally connected to the base plate 2 and which allows adjustment of the inclination angle of the pivotal arm 3 relative to the base plate 2.

In FIG. 2, numerals 6, 6a and 6b denote brackets on which a seat pan (not shown) is mounted. Although not shown in the drawing, a seat cushion is mounted on the seat pan. Denoted by numerals 7 and 7a are front left and front right link mechanisms which are arranged at axial both ends of the front elongate bracket 6. Denoted by numerals 7b and 7c are rear left and rear right link mechanisms which are arranged at the rear smaller bracket 6a and 6b, respectively. Denoted by numeral 8 is a rear drive mechanism for adjusting the height of a rear portion of the seat pan, and denoted by numeral 9 is a front drive mechanism for adjusting the height of a front portion of the seat pan. Denoted by numeral 10 is a connecting pipe for synchronizing the operation of the link mechanisms 7b and 7c, and denoted by numeral 11 is a connecting pipe for synchronizing the operation of the link mechanisms 7 and 7a. Denoted by numeral 12 is a tension spring which extends between the connecting pipes 10 and 11.

As is seen from FIGS. 1 and 2, the front left link mechanism 7 comprises a bracket 14 secured to the connecting pipe 11. The bracket 14 has one end to which a front end of the tension spring 12 is hooked. An arm 15 is pivotally connected to the bracket 14 through a pivot pin 16. A flanged left end of the front elongate bracket 6 is pivotally connected to the arm 15 through a pivot pin 17. The left end of the connecting pipe 11 tightly receives therein a small shaft 18 which is rotatably supported by the left base plate 2. Thus, the pipe 11 is rotatable about its axis. The left end of the connecting pipe 11 has an arm 19 secured thereto.

A sector gear 22 is concentrically disposed about the small shaft 18 and secured to the arm 19 through a connecting pin 20 and a push nut 21, so that the sector gear 22 rotates together with the pipe 11 about the axis of the pipe 11. The sector gear 22 has teeth 22b at its rear portion. Engaged with the teeth 22b of the sector gear 22 is a drive gear 24 of the front drive mechanism 9.

It is to be noted that the sector gear 22 is positioned in front of the front drive mechanism 9. That is, in according to the present invention, the sector gear 22 is positioned near a front end of the seat cushion of the seat. Thus, the moment applied to the sector gear 22 when a person sits on the seat is relatively small. This means that raising of the front portion of the seat cushion using the front drive mechanism can be achieved by a relatively small force.

Figure 6:
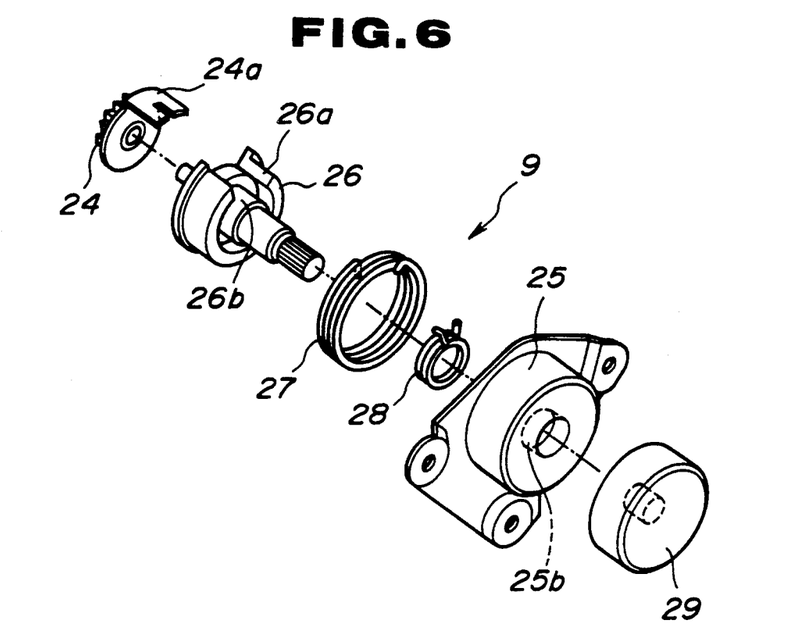
FIG. 6 is an exploded view of a brake mechanism employed in the seat adjuster.
Figure 7:
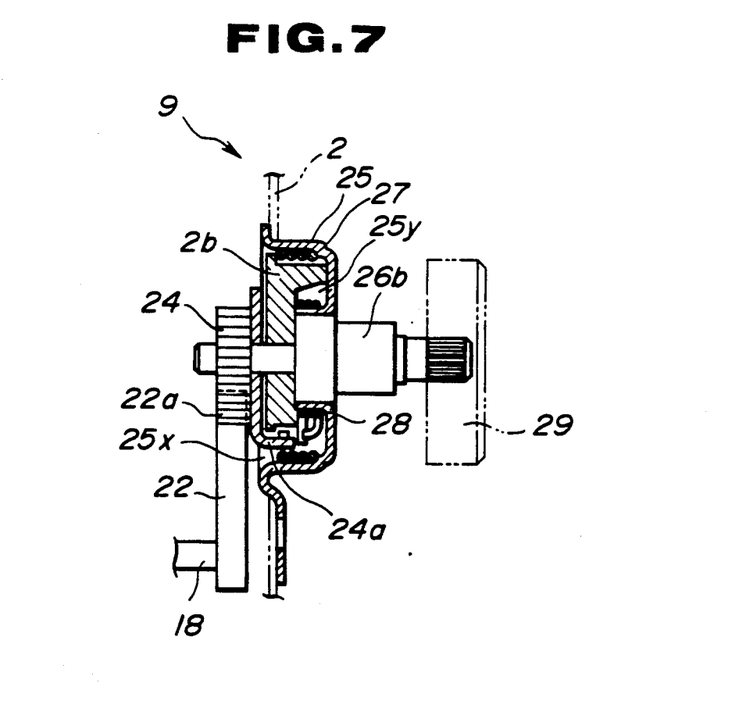
FIG. 7 is a sectional view of the brake mechanism in an assembled condition.

As is shown in FIGS. 6 and 7, the front drive mechanism 9 comprises a brake drum 25 which is secured to an outer surface of the base plate 2. A core 26 is rotatably received in the brake drum 25. A large coil spring 27 is received in the brake drum 25 and presses against a first braking surface 25x (see FIG. 7) of the brake drum 25. The coil spring 27 has both ends bent inward and received in a groove 26a of the core 26. A smaller coil spring 28 is received in the brake drum 25 in a manner to press against a second brake surface 25y of the brake drum 25. The smaller coil spring 28 has both ends bent outward and received in the groove 26a of the core 26. One of the bent ends of the smaller coil spring 28 is hooked on a lug 24a of the drive gear 24. The lug 24a is loosely engaged in the groove 26a of the core 26. The core 26 has a coaxial shaft 26b integrally connected thereto. The shaft 26b has an inboard end about which the drive gear 24 is rotatably disposed and an outboard end about which a control knob 29 is secured.

The drive mechanism 9 has a brake or one-way clutch function. When a torque is applied to the drive gear 24 from the sector gear 22, the drive gear 24 is rotated slightly together with the lug 24a. The rotation of the lug 24a brings about an abutment of the lug 24a with one bent end of the large coil spring 27 thereby expanding the spring 27. The expansion of the spring 27 increases the frictional engagement with the first braking surface 25x. Furthermore, the slight rotation of the lug 24a pulls the engaged one bent end of the smaller coil spring 28 causing a contraction of the same. The contraction of the spring 28 increases the frictional engagement with of the same against the second braking surface 25y. Under these conditions, the core 26 is locked in the brake drum 25. Thus, even when a torque is applied to the drive gear 24 from the sector gear 22, the drive gear 24 is not permitted to rotate. Accordingly, the relationship between the parts which are engaged with the drive gear 24 remains unchanged.

On the other hand, when a torque is applied to the core 26 from the control knob 29, the core 26 is rotated slightly. The turning of the core 26 brings about an abutment of one edge of the groove 26a with one bent end of the large coil spring 27 thereby inducing a contraction in the spring 27. Furthermore, the rotation of the core 26 brings about an expansion of the smaller coil spring 28. Under these conditions, the above-mentioned frictional engagements are no longer induced. Thus, the control knob 29 is permitted to rotate and turn the drive gear 24. This induces a change in the conditions between the parts engaged with the drive gear 24.

As is seen from FIGS. 2 and 3, the front right link mechanism 7a comprises a bracket 14a secured to the connecting pipe 11. An arm 15a is pivotally connected to the bracket 14a through a pivot pin 16a. A flanged right end of the front elongate bracket 6 is pivotally connected to the arm 15a through a pivot pin 17a. The right end of the pipe 11 is rotatably supported by the right base plate 2a. Denoted by numeral 23a is an E-ring for holding the right end of the pipe 11 in place.

As is seen from FIGS. 1 and 2, the rear left link mechanism 7b comprises a bracket 32 secured to the connecting pipe 10. A flanged left end of the smaller rear left bracket 6a is pivotally connected to the bracket 32 through a pivot pin 33. The bracket 32 is of a bellcrank type having one end to which a rear end of the tension spring 12 is hooked. The left end of the connecting pipe 10 is rotatably supported by the left base plate 2 and held in place by an E-ring 31. An arm 30 is secured to the connecting pipe 10 near the left end of the pipe 10. A link 34 is pivotally connected at its rear end to the arm 30 through a pivot pin 35. A front end of the link 34 is pivotally connected through a pivot pin 35 to a rear end of a sector gear 22'. The sector gear 22' is pivotally connected to the left base plate 2 through a pivot pin 36. The sector gear 22' has teeth 22'b at its front portion. Engaged with the teeth 22'b of the sector gear 22' is a drive gear of the rear drive mechanism 8. The construction of this mechanism 8 is substantially the same as that of the afore-mentioned front drive mechanism 9. That is, the rear drive mechanism 8 comprises a brake drum 25a, a core with a shaft 26c, larger and smaller coil springs and a control knob 29a.

It is to be noted that the control nob 29a of the rear drive mechanism 8 is positioned near the control knob 29 of the front drive mechanism 9.

As is seen from FIGS. 2 and 3, the rear right link mechanism 7c comprises a bracket 32a secured to the connecting pipe 10. A flanged left end of the smaller rear right bracket 6b is pivotally connected to the bracket 32a through a pivot pin 33a. The right end of the connecting pipe 10 is rotatably supported by the right base plate 2a and held in place by an E-ring 31a.

The brackets 6, 6a and 6b, the front left and right link mechanisms 7 and 7a, the rear left and right link mechanisms 7b and 7c, and the front and rear drive mechanisms 9 and 8 thus constitute a seat lifting mechanism of the seat adjuster of the invention.

In operation, the control knob 29 of the front drive mechanism 9 is turned clockwise in FIG. 1, the drive gear 24 (see FIG. 6) is turned in the same direction thus rotating the sector gear 22 in a counterclockwise direction about its center. For the reason as mentioned hereinabove, the counterclockwise rotation of the sector gear 22 causes a rotation of the connecting pipe 11 in the same direction. With this, the arms 15 and 15a are pivoted upward and thus the front elongate bracket 6 is raised. Thus, the front portion of the seat is raised. On the other hand, when the control knob 29 is turned counterclockwise, the parts 24, 22, 11, 15, 15a and 6 are moved in the reverse directions and thus the front portion of the seat is lowered.

Due to the above-mentioned one-way clutch function of the drive mechanism 9, the condition of the front portion of the seat is maintained unchanged even when a considerable load is applied to the seat lifting mechanism by a passenger (or the like) on the seat.

When the control knob 8 of the rear drive mechanism 8 is turned clockwise in FIG. 1, the sector gear 22' is turned in a counterclockwise direction. This rotation moves the link 34 leftward in FIG. 1 and thus turns the connecting pipe 10 in a clockwise direction. Thus, the rear smaller brackets 6a and 6b are raised along with the rear portion of the seat. On the other hand, when the control knob 8 is turned counterclockwise, the parts 22', 34, 10, 6a and 6b are moved in the reversed directions and thus the rear portion of the seat is lowered.

Due to the one-way clutch function provided in the drive mechanism 8, the condition of the rear position is maintained unchanged even when a considerable load is applied to the seat lifting mechanism.

In the following, the seat reclining mechanism included in the seat adjuster of the invention will be described in detail with reference to FIGS. 8 to 10.

Figure 8:
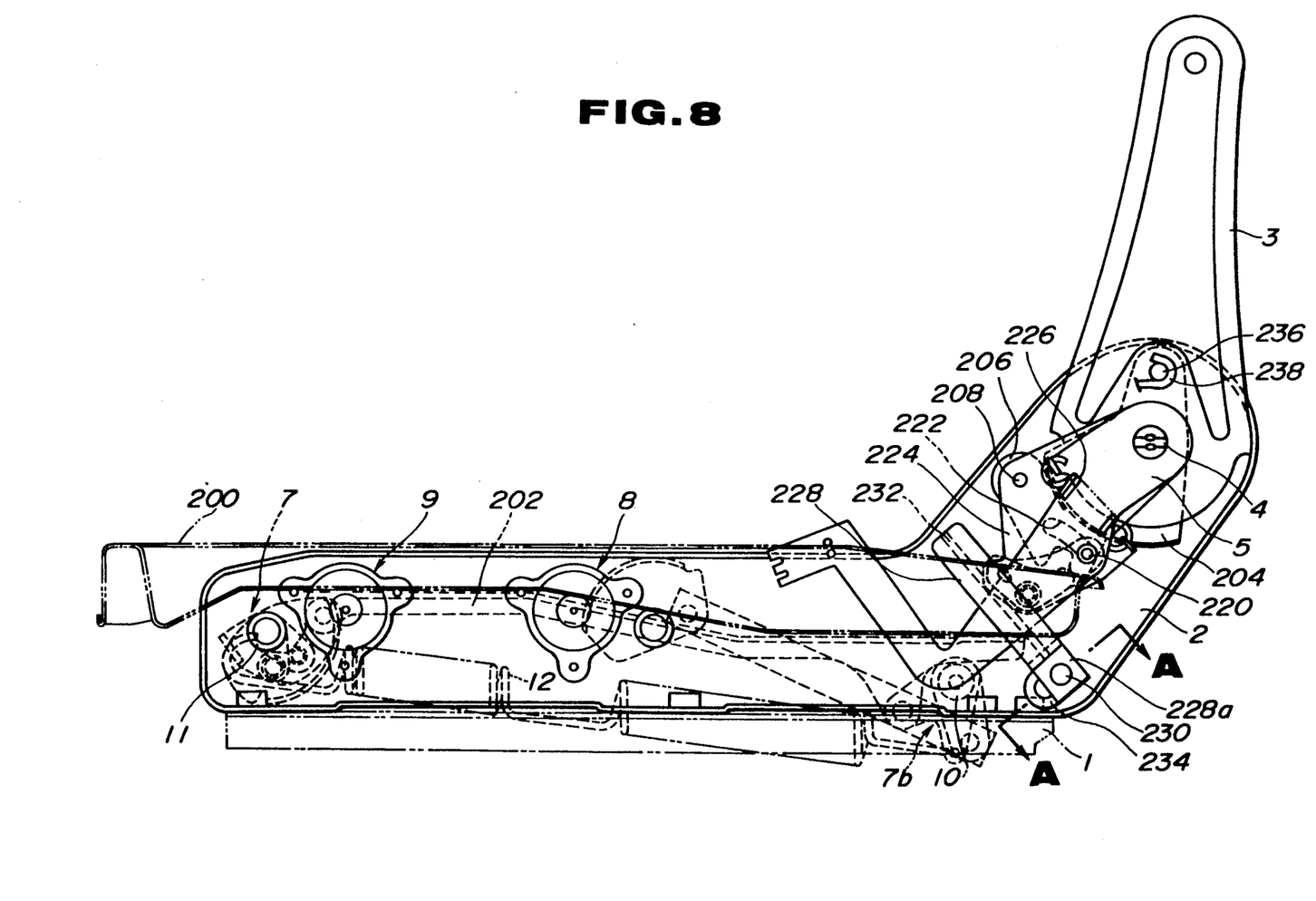
FIG. 8 is a view similar to FIG. 1, showing details of parts which constitute a seat reclining mechanism.
Figure 9:
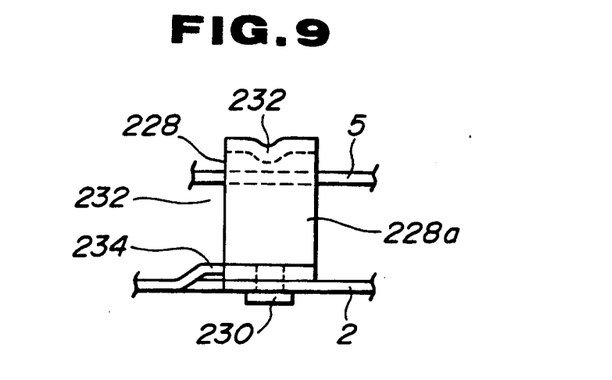
FIG. 9 is a sectional view taken along the line A—A of FIG. 8.

In FIG. 8, numeral 1 denotes the left upper rail, 2 the left base plate raised from the upper rail 1, and 3 the pivotal arm which is pivotally connected through the hinge shaft 4 to the rear portion of the base plate 2. Although not shown in the drawing, the pivotal arm 3 is secured to a left side of a seatback. Denoted by numeral 5 is the release lever for adjusting the inclination angle of the pivotal lever 3 relative to the base plate 2.

Denoted by numeral 200 is a seat pan on which a seat cushion part of the seat is mounted. Side brackets 202 are secured to a lower surface of the seat pan 200 at both sides of the same. Denoted by numerals 7 and 7b are the front left and rear left link mechanisms, 8 is the rear drive mechanism and 9 is the front drive mechanism. Denoted by numerals 10 and 11 are the rear and front connecting pipes, and 12 is the tension spring.

Figure 10:
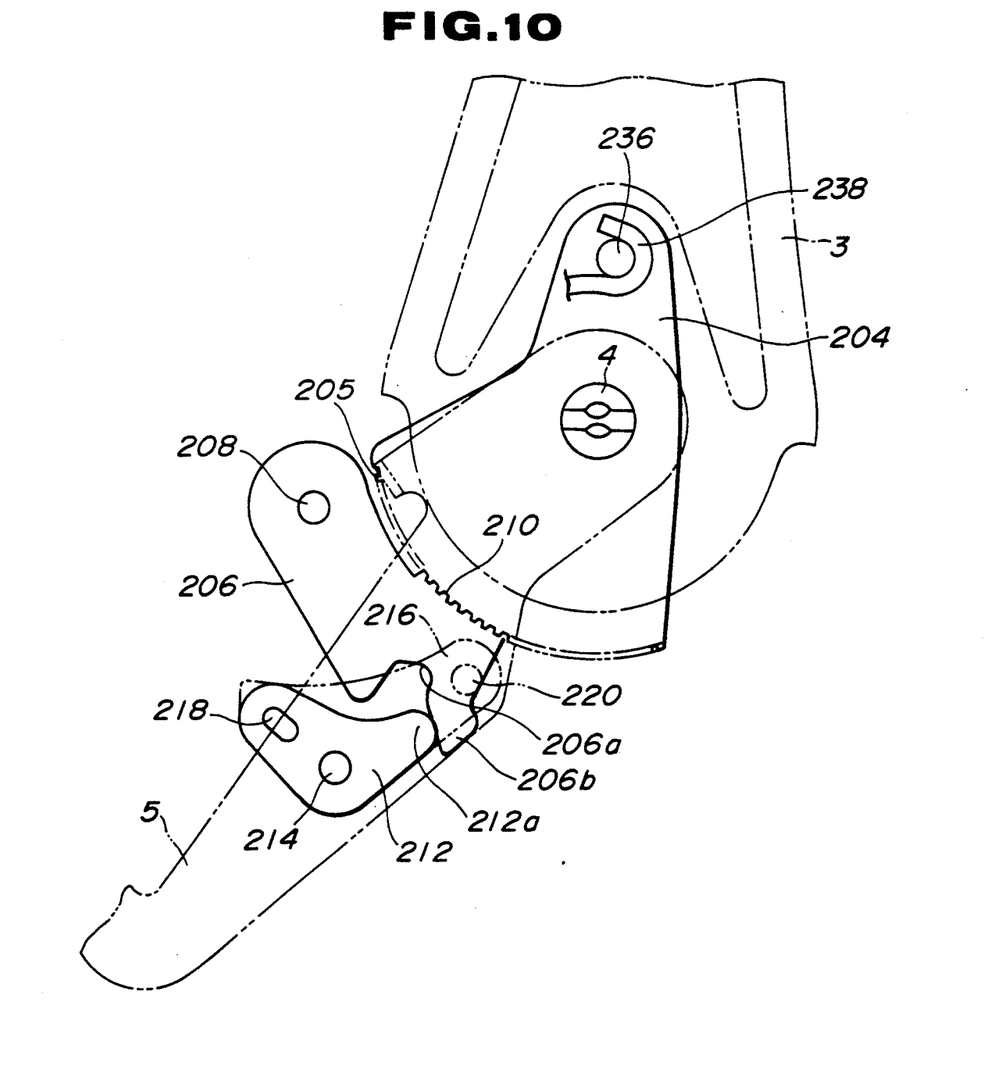
FIG. 10 is an enlarged view of parts which constitute essential elements of the seat reclining mechanism.

As is shown in FIG. 10, a first toothed member 204 is secured to the pivotal arm 3 to pivot therewith about the axis of the hinge shaft 4. The first toothed member 204 has a toothed arcuate edge 205. A second toothed member 206 is pivotally connected through a pivot pin 208 to the left base plate 2. The second toothed member 206 has a toothed arcuate edge 210 which is meshed with the toothed edge 205 of the first toothed member 204. The second toothed member 206 is formed near the toothed edge 210 with a recess 206a and a projection 206b. A cam member 212 having a projection 212a slidably engageable with the recess 206a and the projection 206b is pivotally connected through a pivot pin 214 to the left base plate 2. A cam plate 216 is secured to the cam member 212 to pivot therewith about the pin 214. Denoted by numeral 218 is an embossed portion by which the cam plate 216 and the cam member 212 are united. A pin 220 is secured to the cam plate 216.

As will be understood from FIG. 8, the pin 220 passes through an arcuate slot 222 formed in a holder plate 224. The pin 220 has a leading end secured to the release lever 5. Thus, when the release lever 5 is pivoted about the hinge shaft 4, the cam unit (see FIG. 10) consisting of the cam member 212 and the cam plate 216 is pivoted about the pin 214. The holder plate 224 is so sized as to conceal the cam plate 216, the cam member 212, the second toothed member 206 and part of the pivotal arm 3 and the first toothed member 204. The holder plate 224 has hinge shaft 4, the pivot pin 208 and the pivot pin 214 connected thereto.

As is seen from FIG. 8, the release lever 5 extends from the hinge shaft 4 toward the rear drive mechanism 8. A return spring 226 extends between the release lever 5 and the holder plate 224 to bias the release lever 5 downward, that is, in a counterclockwise direction in the drawing.

An elongate guide plate 228 is secured at its bent lower portion 228a to the left base plate 2, by means of a rivet 230. With this, as is understood from FIG. 9, there is defined between the guide plate 228 and the base plate 2 an elongate guide space 232 in which a part of the release lever 5 is received. The elongate guide plate 228 is formed at its inner surface with a longitudinally extending ridge 232 to which the release lever 5 is frictionally contactable during its pivoting. For assuring the fixed connection of the guide plate 228 to the base plate 2, a stopper boss 234 is formed on the base plate 2.

The pivotal arm 3 is formed with a pin 236. Between the pin 236 and the hinge shaft 4, there is arranged a return spring 238 by which the pivotal arm 3 is biased forward.

Because the elongate guide plate 228 is provided, the pivoting movement of the release lever 5 is reliably carried out. The provision of the longitudinally extending ridge 232 of the guide plate 228 minimizes the friction generated between the release lever 5 and the guide plate 228.

In the following, operation of the seat reclining mechanism will be described.

Under rest or latched condition of the mechanism, the parts of the same assume the operating positions as shown in FIG. 10 wherein the release lever 5 assumes a lowermost position, the projection 212a of the cam member 212 abuts against the projection 206b of the second toothed member 206 and thus the teeth 210 of the second toothed member 206 are meshed with the teeth 205 of the first toothed member 204. Thus, the seatback (viz., the pivotal arm 3) is locked at a certain angular position relative to the base plate 2.

When the release lever 5 is pivoted clockwise about the hinge shaft 4 against the biasing force of the return spring 226, the pin 220 secured to the release lever 5 pivots the cam unit (212+216) about the pivot pin 214 in a counterclockwise direction. With this, the projection 212a of the cam member 212 is slid from the projection 206b of the second toothed member 206 to the recess 206a of the same inducing a counterclockwise pivoting of the second toothed member 206 about the pivot pin 208, and thus, the teeth 210 of the second toothed member 206 are disengaged from the teeth 205 of the first toothed member 204. Thus, while the release lever 5 is pulled upward, the seatback (viz., the pivotal arm 3) is freely pivotal about the hinge shaft 4. The release lever 5 is released when the seatback is pivoted to a desired new angular position. With this, the release lever 5 is turned back to the lowermost position due to the biasing force of the return spring 226, and thus, the pin 220 turns the cam unit (212+216) and the second toothed member 206 to their operating positions as shown in FIG. 10. Thus, the seatback becomes locked in the new angular position.

What is claimed is:

1. A seat adjuster for adjusting the position of a seat having a seat pan, comprising:
   parallel first and second base members (2, 2a);
   spaced first and second rod members (11, 10), each being rotatably supported by said base members;
   first and second link mechanisms (7, 7a) respectively connected to spaced portions of said first rod member and mounting thereon a first part of said seat pan, said first and second link mechanisms raising said first part of the seat pan when said first rod member is rotated about its axis in a given direction;
   third and fourth link mechanisms (7b, 7c) respectively connected to spaced portions of said second rod member and mounting thereon a second part of said seat pan, said third and fourth link mechanisms raising said second part of the seat pan when said second rod member is rotated about its axis in a given direction;
   first and second drive mechanisms (9, 8) mounted to spaced portions of said first base plate for rotating said first and second rod members respectively, each drive mechanism having a one-way clutch function which locks parts of said drive mechanism when a torque is applied thereto from the associated rod member; and
   a first sector gear (22) secured to said first rod member for synchronous rotation therewith, said first sector gear having teeth (22b) directed toward said first drive mechanism (9) and operatively engaged with the same, and
   wherein said first drive mechanism (9) is disposed between said sector gear (22) and said second drive mechanism (8).

2. A seat adjuster as claimed in claim 1, in which the teeth of said second sector gear are engaged with a driving gear of said first drive mechanism.

3. A seat adjuster as claimed in claim 2, in which said first rod member is hollow and has one end rotatably supported by said second base member and a second end which has a small shaft telescopically received therein, said small shaft being rotatably supported by said first base member.

4. A seat adjuster as claimed in claim 3, further comprising:
   an arm secured to said pipe;
   a pin secured to said arm and said sector gear; and
   means for supporting said sector gear about small shaft.

5. A seat adjuster as claimed in claim 4, in which each of said first and second link mechanisms comprises:
   a bracket secured to said pipe;
   an arm pivotally connected to said bracket, and
   a first supporting bracket pivotally connected to said arm, said first supporting bracket supporting said seat pan thereon.

6. A seat adjuster as claimed in claim 5, in which each of said third and fourth link mechanisms comprises:
   a bracket secured to said second rod member; and
   a second smaller supporting bracket pivotally connected to said first bracket, said second supporting bracket supporting said seat pan thereon.

7. A seat adjuster as claimed in claim 6, further comprising a tension spring which extends between the bracket secured to said first rod member and the bracket secured to said second rod member.

8. A seat adjuster as claimed in claim 1 further comprising:
   an arm secured to said second rod member;
   a link pivotally connected to said arm and extending toward said second drive mechanism;
   a second sector gear pivotally connected to said first base member and having a portion to which said link is pivotally connected, said second sector gear being operatively connected to said second drive mechanism.

9. A seat adjuster as claimed in claim 8, in which sector gear has teeth which are engaged with a driving gear of said second drive mechanism, said teeth facing toward said first drive mechanism.

10. A seat adjuster as claimed in claim 1, further comprising a seat sliding mechanism which includes:
    a pair of lower rails; and
    a pair of upper rails which are slidably engaged with said lower rails, said upper rails having said first and second base members mounted thereon.

11. A seat adjuster as claimed in claim 10, in which said second base member has a seat belt anchor secured thereto.

12. A seat adjuster as claimed in claim 11, further comprising:
    a extension portion of said second base member, said extension portion having a first curled portion; and
    an elongate reinforcing plate secured to one of said lower rails and extending therealong, said elongate reinforcing plate having a second curled portion which is slidably interlocked with said first curled portion.

13. A seat adjuster as claimed in claim 1, further comprising a seat reclining mechanism which comprises:

a pivotal arm pivotally connected to said first base member, said pivotal arm being secured to one side of a seatback of said seat;

a position lock mechanism for locking said pivotal arm at a desired angular position relative to said first base member;

a release lever pivotally connected to said first base member for causing said position lock mechanism to unlock said pivotal arm when pivoted in one direction; and a guide plate connected to said first base member to define therebetween a guide space in which a part of said release lever is received.

14. A seat adjuster as claimed in claim 13, in which said guide plate is formed at its inner surface with a longitudinally extending ridge with which said release lever is frictionally contactable during the pivotal movement of the lever.

15. A seat adjuster as claimed in claim 14, in which said first base member is formed with a stopper boss for assuring the connection of said guide plate relative to said first base member.

* * * * *